Feb. 13, 1968 L. C. GANOE 3,368,528
SIMULATED DOG-BONE AND METHOD OF MAKING THEREOF
Filed March 21, 1966 2 Sheets-Sheet 1

INVENTOR
LEO C. GANOE
by Kenway, Jenney & Hildreth
ATTORNEYS

Feb. 13, 1968     L. C. GANOE     3,368,528
SIMULATED DOG-BONE AND METHOD OF MAKING THEREOF
Filed March 21, 1966     2 Sheets-Sheet 2

Inventor
LEO C. GANOE
by Kenway, Jenney & Hildreth
ATTORNEYS

United States Patent Office 3,368,528
Patented Feb. 13, 1968

3,368,528
SIMULATED DOG-BONE AND METHOD
OF MAKING THEREOF
Leo C. Ganoe, Curwensville, Pa., assignor to Superior
Pet Products, Inc., Curwensville, Pa., a corporation of
Massachusetts
Filed Mar. 21, 1966, Ser. No. 536,082
15 Claims. (Cl. 119—29)

ABSTRACT OF THE DISCLOSURE

A simulated animal bone made of a sheet of rawhide having turned-in end portions to provide a greater thickness on the ends thereof than a central portion and rolled to form the shape of a bone and dried to hardness.

This invention relates to improvements in simulated animal bones and the method of making the same, and in particular to such bones and the methods of making them where the constituent material is an untanned rawhide suitable for use by animals such as dogs as a toy or food.

There are available on the market today simulated or artificial bones for dog owners to buy for their dogs, the bones having somewhat the shape of a natural bone, and being made of material such as a prepared rawhide which is suitable for consumption by the dogs. In many ways, these bones presently available are satisfactory, but in other ways they leave several things to be desired. For example, in some instances the finished product as sold can be improved as to the simulation or imitation of the shape of a natural animal bone. In still other cases, the method of preparing the final shape of the bone is more expensive than need be.

In general, then, this invention is concerned with producing an improved simulated animal bone which has a pleasing color and appearance acceptable to a prospective purchaser, is suitable as a dog food or plaything, and which closely resembles a natural bone in appearance, shape, and hardness.

Therefore, among the several objects and advantages of the invention may be the following: the provision of a simulated animal bone having an appearance approaching that of a natural bone; the provision of simple and economical methods of forming the constituent material into a configuration which, when dry, will simulate a natural bone closely; the provision of methods of forming the bone which are adapted to rapid production; the provision of an improved simulated animal bone which is edible as animal food; and the provision of a simple and economical method of forming the rawhide into the shape of a natural bone, without the necessity of tying any knots therein, or of performing any slitting operations after the material is shaped into the desired form.

Other objects and advantages of the invention will be in part obvious and in part pointed out hereinafter.

The invention accordingly comprises the elements and combination of elements, features of construction, and steps and sequence of steps of the methods, all of which will be exemplified in the structures of the article and in the methods hereinafter described, and the scope of the application of which will be indicated in the appended claims.

In the accompanying drawings, in which are shown a representative final article embodiment of the invention, and which illustrate two methods to obtain the desired shape of the finished article:

Figure 1:
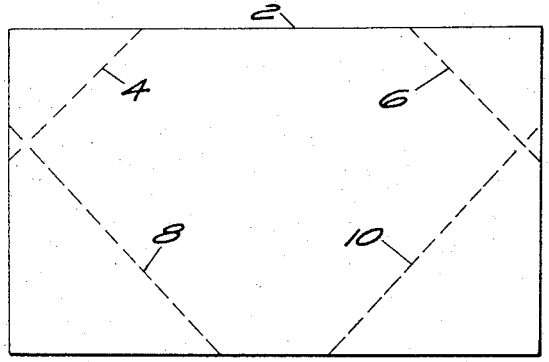
FIG. 1 is a plan view of a sheet of the material of the invention from which a dog bone of the invention is to be formed by folding and wrapping, dotted lines on the view indicating where the folds are to be made.
Figure 2:
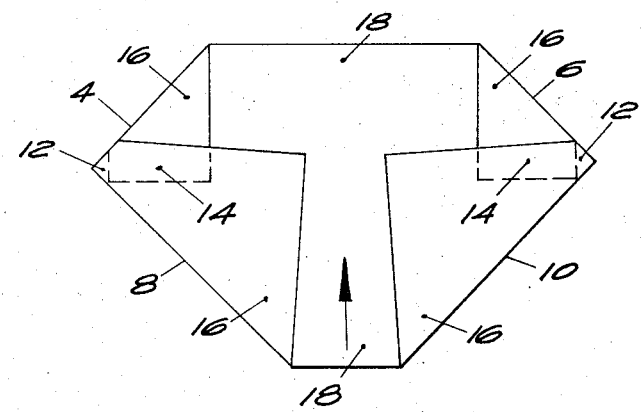
FIG. 2 is a plan view of the sheet of FIG. 1 showing the piece of FIG. 1 after preliminary folds have been made on the indicating fold lines.
Figure 3:
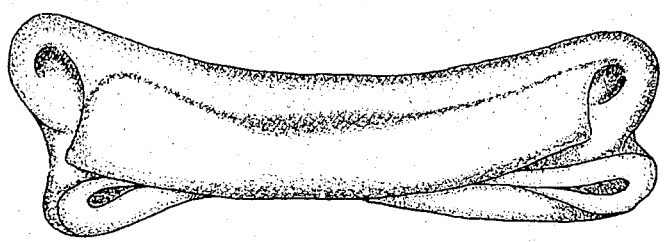
FIG. 3 is an illustration showing one view of the simulated animal bone of this invention in its final appearance after the folded piece of FIG. 2 has been wrapped on itself.

Referring to FIGS. 1–3 for one method of forming a simulated bone and the product thereof, from a sheet of rawhide (preferably rawhide as prepared by the method set forth in a copending U.S. patent application in the name of Lars Nordstrom, filed of even date hereof), and while still in a supple undried state, rectangular pieces are cut. The size of these is dependent on the wanted size of bone. As an example, for a finished bone which will be approximately six inches long, about one inch in diameter at the center, with knuckle ends approximately one to two inches in thickness, the starting size of the rectangular piece can be approximately ten inches along the long edges and six inches along the short edges. For the above indicated final size, the rawhide can be approximately $3/16$ to $1/4$ inch in thickness. (It is emphasized that these figures are only approximate, since the final size will depend to some extent on the tightness of final rolling or folding.)

Referring to FIG. 1, there is shown a plan view of a rectangular piece 2 of bleached rawhide with initial fold lines being indicated by dotted lines. It will be noted that there are two lines indicated by numerals 4 and 6, one being at each of the upper corners of the rectangular sheet. Another pair of fold lines is indicated by numerals 8 and 10 at the bottom two corners of the sheet. It will also be noted that fold line 8 crosses over line 4, and fold line 10 crosses over line 6.

The corner portions of the sheet are folded inwardly of the sheet along the indicated dotted lines, until the corner portions lie against the sheet body. Because of the crossing of the fold lines as stated above, it will be noted that at two places 12 (see FIG. 2) on the thus folded piece, there will be four layers of rawhide. Inwardly of places 12, at the places indicated by numeral 14, there will be three layers of folded material. Still further inwardly at places indicated by numeral 16, there will be two layers of material, and finally at the areas indicated by numeral 18 there will be a single layer.

The next step in the forming is to wrap or roll the material upon itself in the direction indicated by the arrow in FIG. 2 to make a generally elongated structure as shown in FIG. 3. As a result of this wrapping, it will be found that the thus formed final structure has varying thickness from each end to the middle thereof, and thus it is to be noted that in the final simulated bone (FIGS. 3 and 4) the cross-section progresses from a relatively small center section to relatively thick end sections, the thick end sections simulating the knuckle ends of a natural bone. (If desired, but not necessary, the sections 12 can be further folded inwardly to produce an even thicker "knuckle" end.)

Figure 5:
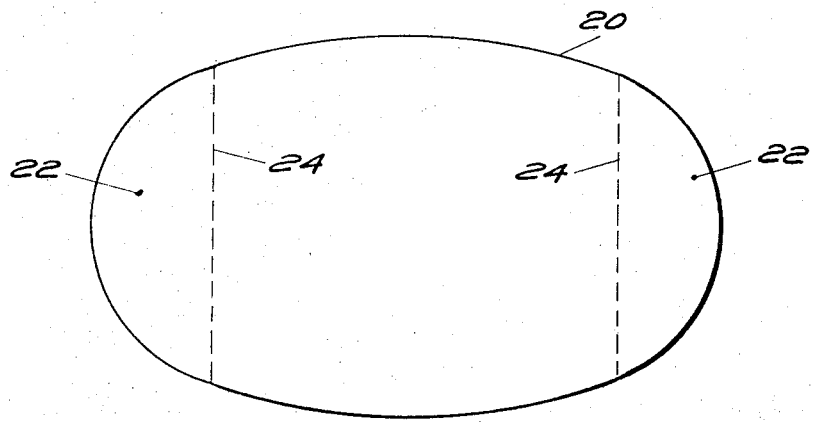
FIG. 5 is a view of a second embodiment of the invention, showing a differently shaped piece from which the simulated animal bone may be formed.
Figure 6:
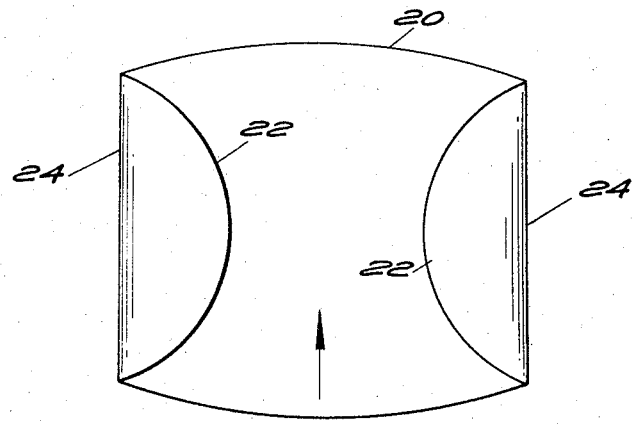
FIG. 6 is a plan view of the sheet of FIG. 5 showing the piece of FIG. 5 after preliminary folds have been made on the indicating fold lines.

It has been found that the above method of folding and wrapping has produced the best simulation of a natural bone. Of course, other starting configurations of the piece of rawhide can be used, and reference to FIGS. 5 and 6 will show another method of forming a simulated animal bone. In this instance, the starting piece 20 is made in oval shape as shown in FIG. 5, and the extremities 22 are folded inwardly along the fold lines 24 (indicated by the dotted lines) to lie against the sheet body. Having made these folds (as shown in FIG. 6) then again the wrapping operation is done as before, in the direction indicated by the arrow on FIG. 6. The end result will be approximately that shown in FIGS. 3 and 4, but in this instance, the simulated bone product has a more abrupt transition from the thickened ends to the shank of the bone than is shown in the finished product of FIGS. 3 and 4.

With the teaching of this invention in hand, it is apparent that other configurations or starting pieces can be used in order to obtain the thick knuckle ends and the relatively small-diameter center section by folding and wrapping operations, these configurations suggesting themselves to the person who is making the end product. The key to the invention is the use of a greater number of layers at what eventually will constitute the ends of the bones, as compared to a lesser number of layers as one progresses along the length of the bone from a knuckle end to the center. It will also be noted that the thickened knuckle ends are obtained without the necessity of trying to tie knots in a relatively slippery piece of rawhide, and without the necessity of cutting slits in the wrapped piece through which ends of the folded rawhide must be inserted in order to provide the thickened end. Thus, the folding and wrapping operations lead to economy in manufacture because of their essential simplicity and ease or production.

Figure 4:
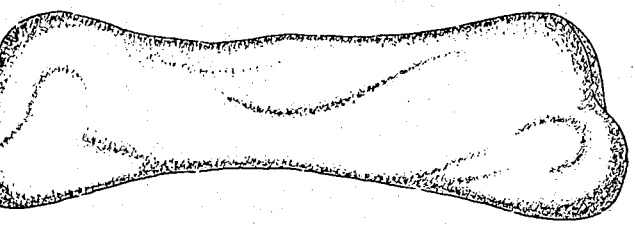
FIG. 4 is another view of the FIG. 3 final simulated animal bone.

After the material has been wrapped upon itself into the shape shown in FIGS. 3 and 4, the structure is then dried, preferably in forced air, at a temperature which should not exceed 120° F. for most economical manufacture.

It has been found that the wrapped rawhide forms will keep their shape during drying if the temperature of the air is kept below 120° F. If it is desired to dry the wrapped piece faster, a higher temperature can be used, but this may necessitate the use of some means of holding the material together during the drying operation.

In view of the above it will be seen that the several objects of the invention are achieved and other advantageous results attained.

It is to be understood that the invention is not limited in its application to the details of construction and arrangement of parts illustrated in the accompanying drawings, nor to the methods described, since the invention is capable of other embodiments and of being practiced or carried out in various ways. Also, it is to be understood that the phraseology or terminology employed herein is for the purpose of description and not of limitation.

As many changes could be made in the above constructions and mehods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A simulated animal bone comprising an elongated plural-layered form constituted entirely of one piece of folded and rolled sheet rawhide with all the layers of the form lying about a generally common lengthwise axis, at least one end portion of the bone having more layers, including a turned-in edge portion than the central portion, said end portion thereby being thicker than said central portion.

2. The bone of claim 1 in which the rawhide is in a bleached state.

3. The bone of claim 1 in which the layers of each of the end portions include the same layers of the rawhide that form the central portion and additional shorter layers of turned-in edge portions of the rawhide sheet.

4. The bone of claim 1 in which the shape of the sheet of rawhide from which the bone is formed is polygonal.

5. The bone of claim 1 in which the shape of the sheet of rawhide from which the bone is formed is curvilinear.

6. The bone of claim 3 in which the layers of said end portion also include turned-in corners of the rawhide sheet.

7. A simulated animal bone comprising a plural-layered roll entirely of one piece of folded and rolled sheet rawhide with all the layers of the roll lying about a generally common lengthwise axis, the roll having central and end portions and an intermediate portion between the central and end portions, the number of layers in the end including a turned-in edge portion, intermediate and central portions being in decreasing magnitude from the end portions to the central portion, whereby the thickness of the bone decreases progressively from the end portions to the central portion.

8. The method of making a simulated animal bone from a sheet of rawhide comprising the steps of:
 folding at least one edge portion of the sheet inwardly to lie against the body of the sheet and provide a structure having a plurality of layers along an edge thereof adjacent a portion of the sheet having a lesser number of layers;
 wrapping said structure upon itself to form an elongated plural-layered form with the edge portion of the structure creating a plural-layered end of the form thicker than portions of the form adjacent said end; and
 drying the form to hardness.

9. The method of claim 8 in which said sheet is polygonal in shape.

10. The method of claim 9 in which said sheet is rectangular in shape.

11. The method of claim 8 in which said sheet is curvilinear in shape.

12. The method of making a simulated animal bone from a rectangular-shaped sheet of rawhide having top and bottom corners comprising the steps of:
 folding a first corner of the sheet inwardly thereof toward the center of the sheet;
 folding a second corner of the sheet inwardly thereof toward the center of the sheet, said second corner being from the same edge as said first corner;
 wrapping the sheet, as thus folded, upon itself in a direction parallel to the edge of the sheet from which said corners are folded to form an elongated plural-layered form with the folded corners creating a plural-layered end of the form thicker than portions of the form adjacent said end; and
 drying the form to hardness.

13. The method of claim 12 in which one of the folds of said corners includes a portion of the fold of the other of said corners, thereby to increase the thickness of the end of the form.

14. The method of claim 12 including the step of folding the other pair of corners in the same manner as are folded the said first and second corners prior to said wrapping.

15. The method of making a simulated animal bone from a sheet of rawhide comprising the steps of:
 folding opposite extremities of the sheet inwardly thereof to lie against the body of the sheet and provide plural layers at marginal portions of the body with the portion of the body therebetween having a lesser number of layers;

wrapping the thus-folded body on itself transversely of the direction of folding to form a plural-layered form with said plural-layered marginal portions creating plural-layered ends thicker than the central portion of the form; and drying the form to hardness.

References Cited

UNITED STATES PATENTS

| | | | |
|---|---|---|---|
| 2,185,547 | 1/1940 | Fowler | 119—29.5 |
| 2,988,045 | 6/1961 | Fisher | 119—29 |

FOREIGN PATENTS 674,261  11/1963  Canada.

HUGH R. CHAMBLEE, *Primary Examiner.*